Dec. 19, 1961  D. EOLKIN  3,013,887
PROCESS FOR TREATING MEATS
Filed July 20, 1959  2 Sheets-Sheet 2

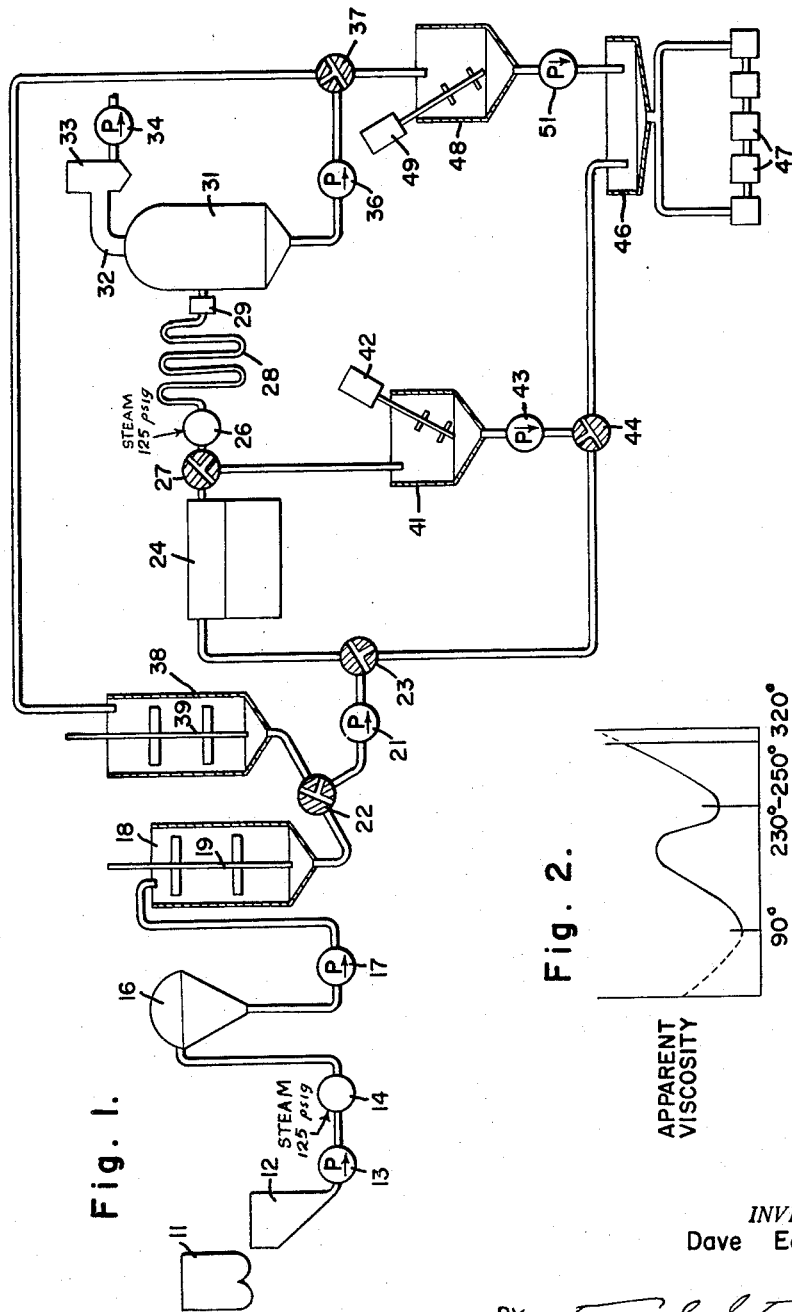

INVENTOR
Dave Eolkin

BY Townsend and Townsend
attorneys 3,013,887
PROCESS FOR TREATING MEATS
Dave Eolkin, San Lorenzo, Calif., assignor to Gerber Products Company, Fremont, Mich., a corporation of Michigan
Filed July 20, 1959, Ser. No. 828,413
7 Claims. (Cl. 99—187)

This invention relates to a new and improved process for treating meats. Reference is made to co-pending patent application of Le Roy R. Hawk, Dave Eolkin, Robert P. Smith and Robert L. Tambini, Serial No. 680,107, filed August 26, 1957, issued under Letters Patent No. 2,903,577 on October 13, 1959.

One of the problems encountered in the preparation of strained meat is the lack of stability of such products in the sense of liquid-solid separation when the product has been subjected to relatively high temperature storage, with or without the agitation associated with transportation and handling. The present invention materially improves such stability and constitutes an improvement in the art.

The present invention comprises presterilization heat treatment of strained meat at higher temperature than has heretofore been employed in order to stabilize the resultant product. The terms "presterilization temperature" and "presterilization heat," as used herein, refer to heat application prior to retorting. Presterilization heat treatment is followed by rapid evaporative cooling. One of the features of the invention resides in the wide spread between the initial temperature of the evaporative cooling and the final temperature of evaporative cooling which has an important effect upon the stability of the product, all as hereinafter more fully appears. After the product has been packed in containers and sterilized, it is found that the liquid does not separate from the solid phase to an undesirable extent despite prolonged storage at temperatures ranging as high as 130° F. and after subjection to agitation encountered by transportation and handling of the product.

Heretofore strained meats of the types which are the subject of this invention have been heat-processed at presterilization temperatures not over 240° F. It has been found in the past that the stability of the product, after retorting and cooling, increases as the presterilization temperature is increased until a peak is reached, whereupon the stability declines or inverts. Heretofore it has been thought undesirable to heat the product at presterilization temperatures higher than that at which the stability of the resultant product begins to fall off. However, in accordance with the principles of the present invention, the product is heated at a high range of presterilization temperatures between approximately 280° F. to 320° F. for veal and 257° F. to 320° F. for beef. Above 320° F. carbonization is likely to occur. It has been found that stability of the product is thereupon considerably higher than when the product is heated in the lower presterilization temperature range which was formerly considered to be the limit beyond which stability decreased. One of the measures of the stability of the product is the apparent viscosity thereof, the apparent viscosity and stability being generally comparable. The apparent viscosity of the resultant product is a measure of the denaturation of the protein content, and accordingly increase in apparent viscosity is a desirable characteristic of strained infants' meats.

The apparent viscosity and denaturation of the resultant product are closely related to the stability thereof. Instability of product is characterized by liquid-solid separation in the slurry and a drop in the apparent viscosity of the slurry.

Another feature of the invention is the fact that the duration of holding the product at the elevated high presterilization temperature range heretofore referred to does not seem to affect the product materially, provided the product is uniformly heated.

A particular feature and advantage of this invention relates to the control of stability of the product by control of what we have denominated the "degree of flash" of the product. By the latter term, we refer to the differential between the initial and final temperatures when the presterilized product is subjected to rapid evaporative cooling. Whereas when products which have been presterilized at conventional temperatures are subjected to evaporate cooling, the stability decreases with the increase in degree of flash, in accordance with the present invention, when the presterilization is conducted at elevated temperatures, the greater the degree of flash, the greater the stability of the product.

Accordingly, the present invention contemplates the presterilization of meat slurry at a high temperature, as hereinafter defined, and then the evaporative cooling of the product with a high degree of flash. The stability of the product is greatly enhanced by this treatment.

Another feature and advantage of this invention relates to the production of junior items. A junior item is a combination of strained meat in accordance with the within process together with some coarser meat.

Another feature and advantage of this invention relates to the employment of a centrifuge to separate tough gristle and meat sinew from the strained meat.

Other objects of the present invention will become apparent upon reading the following specification and referring to the accompanying drawings in which similar characters of reference represent corresponding parts in each of the several views.

In the drawings:

FIG. 1 is a schematic flow sheet showing equipment which may be used in carrying out the process.

FIG. 2 is an illustrative graph showing the apparent viscosity inversion of the veal above approximately 240° F. and below 320° F.

Figure 3:
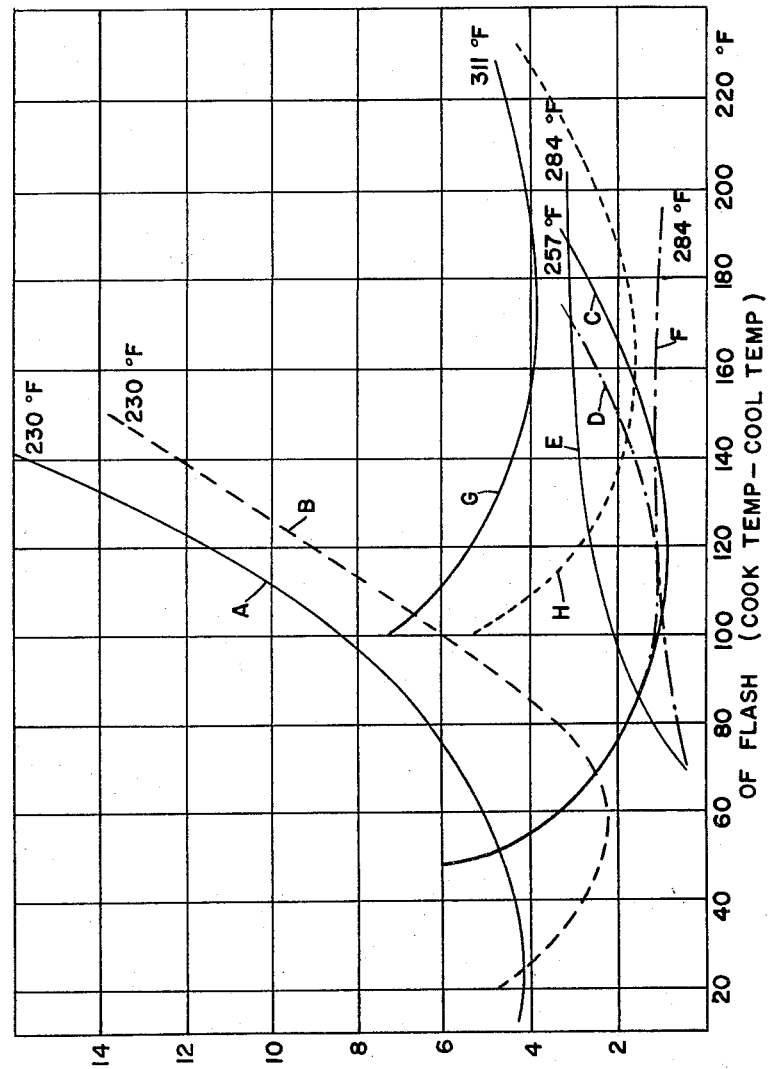
FIG. 3 is a graph showing the stability of beef for different degrees of products presterilized at different presterilization temperatures.

We have discovered that when strained meat is heated above the normal range of presterilization temperatures, the stability and apparent viscosity drops off sharply, to be followed, after temperature is increased, by an inversion or increase of stability or apparent viscosity to thus produce a better and more stable end product (see FIG. 2). We have found that heating veal slurry in the range of 280° F. to 320° F. is productive of the improved product of this invention. Stated differently, heating the strained veal to a temperature above the last apparent viscosity inversion below 320° F. is resultant in a new and improved strained veal having better stability than heretofore.

We have also found that by preheating certain sinewy meats such as lamb and pork to a temperature range of from 220° F. to 240° F. with a target temperature of 230° F. to obtain optimum results and then passing these meats through a centrifuge to separate the meat from these undigestable components, a better product is obtained in accordance with the within process after centrifuging, the temperature range for lamb and pork which may be employed with preferential results and which is above the last apparent viscosity inversion and below carbonization temperature is the range from 300° F. to 320° F.

The term "apparent viscosity" as used herein means a measure of the thixotropic strained meat product measured in viscosity in centipoises, Brookfield 20 r.p.m. with all samples stirred before analysis. It is recognized that the term is not exact but is the best presently known measure of the character of the product in terms of "viscosity."

The present invention also is concerned with the treatment of other meats, such as, for example, strained beef. The problems of stability of strained beef are not as severe as in the case of strained veal. Nevertheless, the process which is the subject of this invention improves the stability of beef as well as veal.

Referring now to FIG. 1, the equipment which may be used in connection with this invention is subject to certain modifications and variations, as will occur to one skilled in the food processing art. The equipment hereinafter described is illustrative of certain equipment which has been found desirable.

The meat and a suitable proportion of water are deposited in batches in mixer 11 and thence periodically deposited in hopper 12. From hopper 12 the product is fed through a positive action pump 13, such as a Moyno pump, into an agitating heater 14, which may be of the type disclosed in Hawk Patent No. 2,492,635 wherein a substantially instantaneous elevation of temperature is accomplished by direct injection of steam and a thorough mixing of the steam and meat. Although an agitating heater 14 is employed in the practice of the invention good results may be obtained by use of a non-agitating heater as well. Heater 14 is for preheating certain meats such as beef and veal less laden with heavy sinew and gristle than certain other meats such as lamb and pork, in order to make such meats more suitable for milling and without the necessity of using a centrifuge. The equipment for raising the temperature of the mixture or the temperature to which it is raised is not considered to be critical. In tests conducted with beef and veal under the supervision of applicants, the mixture was heated to around 190° F. and within the range of 190° F. to 205° F. It was found that by such preheating the viscosity was decreased, the mixture more easily pumped, and less power required for the subsequent milling operation inasmuch as raw meat requires considerably more power for milling than does cooked meat. Further, the gristle, etc. shrinks and becomes tougher and more easily broken by the milling operation after heating. While this preheating operation alone is satisfactory with respect to beef and veal, it has been found more desirable to employ a centrifuge which may be bypassed as to meats not requiring centrifuge and which may be utilized by such meats as do require centrifuge such as lamb and pork. When processing lamb and pork it has been found that a preheating range of from 220° F. to 240° F. may be used with a target range of 230° F. for optimum results. After preheating, the product is passed through a comminutor mill 16 where it is comminuted through a perforated screen having holes .031 inch in diameter or less. The milled product is then pumped by means of pump 17 into a surge tank 18, where it is stirred by stirrer 19. The elapsed time for heating and grinding was approximately 15 to 20 minutes. After the meat passes through the first preheater, items to be centrifuged then pass to the centrifuge not shown to the surge tank 18. Items not requiring centrifuge pass directly to surge tank 18.

From surge tank 18 the meat slurry may be forced by means of pump 21 through valves 22 and 23 for a first pass through homogenizer 24. It has been found that pump 21 is desirable in that it reduces the problems of feeding homogenizer 24 by its own suction. The pressure of homogenization is not considered critical, inasmuch as the homogenizer 24 is used primarily to maintain a positive flow through the second heater 26. This heater 26 may be either of the agitating or non-agitating type. However, agitation during the heating process is considered preferable. A pressure of 1500 p.s.i.g. in homogenizer 24 has been found satisfactory, but such pressure is not critical so long as it is greater than that exerted by the homogenizer feed pump 21.

The slurry discharged from homogenizer 24 passes through valve 27 into second heater 26 of the same type as heater 14 wherein it is heated under extreme agitation by direct injection of steam to the range of presterilization temperatures desired. Steam at 125 p.s.i.g. is introduced into heaters 14 and 26. A pressure of 100 p.s.i.g. is maintained therein and also in holding coil 28. It is believed that the heating of the finely divided meat particles while under extreme agitation to the optimum temperature range produces the desired texture, consistency and stability of the final product. The agitation prevents the particles from sticking together during heating.

From the agitating heater 26 the product passes through holding coil 28 in which the product is held at the desired temperature. The length of time of holding has not been found to be critical within the range of 10 to 120 seconds. Times of greater than 120 seconds require lengths of holding coils which are not commercially practicable.

A back pressure valve 29 is installed beyond holding coil 28 to maintain the slurry at a pressure greater than the vapor pressure of the product at its existing temperature. From the back pressure valve 29 the product discharges into flash chamber 31 or vacuum cooling chamber operated at pressure ranging from 125 mm. of mercury down to 56.6 mm. of mercury. When treating meats such as lamb and pork, flash evaporation to the temperature range of from 100° F. to 220° F. has been found to produce best results. Vapor is continuously removed from chamber 31 through line 32 leading to a tubular condenser 33 evacuated by a pump 34. The degree of flash in chamber 31 is an important feature of the invention, as hereinafter appears.

It is desirable from the standpoint of consumer acceptance that the product be then subjected to a second homogenization step to improve the appearance of the final product, although such homogenization does not materially affect the stability of the product. After retorting, the product which has not been subjected to the second homogenization step appears to the eye to be coarse and hence consumer acceptance of the material is enhanced by the second homogenization. Such step may be carried out with pressure of 3500 p.s.i.g. To accomplish such second homogenization using the same homogenizer 24, cooled product from chamber 31 is pumped by pump 36 through valve 37 to a storage tank 38 stirred by stirrer 39 and thence through valve 22, pump 21 and valve 23 to homogenizer 24 where it passes through valve 27 to tank 41 stirred by stirrer 42. From tank 41 the product is drawn by pump 43 through valve 44 to filler 46 where it is filled into containers 47. It will be appreciated that where two homogenizers are conveniently available, a straight line flow of product may be designed. The containers are then retorted or otherwise sterilized in accordance with conventional cannery practice, as for 75 minutes at 240° F.

Where second homogenization is eliminated, pump 36 draws product from chamber 31 through valve 37 to holding tank 48 stirred by stirrer 49 and whence it is pumped by pump 51 to filler 46.

When a separate partial line is added to the within structure, janitor items may be processed. Junior items are a combination of regular strained food processed in accordance with the within invention, but mixed with some coarser meat. In this separate partial line, not shown in the within diagram, the coarse portions of meat are ground, heated in the range from 230° F. to 250° F. with a target temperature of 240° F., homogenized, filled in a reservoir or storage tank, then mixed with the strained material prior to the canning operation.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A process of preparing a food product which comprises a slurry of comminuted meat and water, preheating said slurry to a temperature in the approximate range of from 220° F. to 240° F., centrifuging said slurry to eliminate meat gristle and sinew, and heating the slurry to a presterilization temperature above the last apparent viscosity inversion thereof and below the carbonization temperature for a time interval of between 10 and 120 seconds.

2. A process according to claim 1 and wherein the product is cooled to the range of 100° F. to 220° F. after presterilization heating and then retorted.

3. A process for producing strained lamb product which comprises comminuting a slurry of lamb and water, subjecting the comminuted slurry to heat in the approximate range of 220° F. to 240° F., centrifuging the preheated mixture, comminuting the preheated mixture, subjecting the comminuted mixture to heat in the temperature range above the last apparent viscosity inversion thereof and below the carbonization temperature comprising the temperature range of from 300° F. to 320° F. and holding the product at approximately said last-named temperature for from 10 to 120 seconds.

4. A process for producing strained pork product which comprises comminuting a slurry of pork and water, subjecting the comminuted slurry to heat in the approximate range of 220° F. to 240° F., centrifuging the preheated mixture, comminuting the preheated mixture, subjecting the comminuted mixture to heat in the temperature range above the last apparent viscosity inversion thereof and below the carbonization temperature comprising the temperature range of from 300° F. to 320° F. and holding the product at approximately said last-named temperature for from 10 to 120 seconds.

5. A process according to claim 3 wherein after subjection to the second heating step, the temperature of the slurry is instantaneously reduced to a range of from 100° F. to 220° F., filling the product into containers and completing cooking of the product in containers.

6. A process of preparing a food product which comprises forming a slurry of comminuted meat and water, heating the slurry to a presterilization temperature above the last apparent viscosity inversion thereof and below carbonization temperature for a time interval of between 10 and 120 seconds, mixing said slurry with coarse meat, filling into containers, sealing the slurry in containers and completing the cooking of the product in containers.

7. A process according to claim 6 wherein the coarse meat is ground, heated to a range of 230° F. to 250° F., homogenized, and then mixed with the slurry prior to filling, canning, and retorting.

References Cited in the file of this patent

UNITED STATES PATENTS

| | | |
|---|---|---|
| 1,240,165 | Balzari | Sept. 18, 1917 |
| 1,557,053 | Hooper | Oct. 13, 1925 |
| 2,492,635 | Hawk | Dec. 27, 1949 |
| 2,753,269 | Hawk et al. | July 3, 1956 |
| 2,870,028 | Anderson et al. | Jan. 20, 1959 |